2,715,114
Patented Aug. 9, 1955

2,715,114
PHENOLIC RESINS

Rodney M. Huck, Longmeadow, Mass., assignor to Monsanto Chemical Company, St. Louis, Mo., a corporation of Delaware No Drawing. Application September 19, 1952,
Serial No. 310,564

8 Claims. (Cl. 260—57)

This invention relates to fusible condensation products of phenols and aldehydes which are soluble in alcohols and aqueous alkali. More particularly the invention relates to a process for preparing such condensation products.

Phenolic molding powders are generally prepared by compounding formaldehyde or some solid form thereof or a substance releasing formaldehyde such as hexamethylene tetramine with a fusible condensation product of phenol and formaldehyde. This is known as the two-stage process and the fusible condensation product is known as a Novolak.

Novolaks are prepared by reacting an excess of a phenol with formaldehyde or other aldehyde under acid conditions, the proportions being computed on a molar basis. The reaction is rapid and difficult to control with the result that the Novolaks vary considerably within a single batch and from batch to batch.

However, it is possible to control the properties of the Novolaks to obtain varying properties in the molding powder. The two most important variables in the molding powder which can be brought under limited control are the rate of cure and the flow during the molding step. Unfortunately these two variables appear to be directly dependent one on the other. For example, the preparation of the Novolak may be controlled to produce a molding powder having a long flow and a slow curing rate but when the reaction is modified to obtain a shorter flow the curing rate is increased. No way has hitherto been found to obtain a long flow with a fast curing rate.

One object of this invention is to provide new Novolaks.

A further object is to provide a process for preparing new Novolaks.

Another object is to provide two-stage phenolic molding powders having a long flow and a fast curing rate.

Still another object is to provide a process for preparing two-stage phenolic molding powders having a long flow and a fast curing rate.

These and other objects are attained by preparing a Novolak by reacting a mol of a monohydric phenol with less than a mol of an aldehyde under alkaline conditions, acidifying the reaction medium and completing the reaction under acid conditions. The molding powders are prepared by dehydrating the Novolak and compounding it with an aldehyde or a compound releasing an aldehyde.

The following examples are given in illustration and are not intended as limitations on the scope of this invention. Where parts are mentioned they are parts by weight.

Example I

Mix 100 parts of phenol with 66 parts of formalin (37% formaldehyde) and heat the mixture to 40° C. Adjust the pH of the mixture to 8.3–8.7 by the addition of a 25% aqueous solution of calcium hydroxide. Heat the reaction mixture to 100° C. under reflux conditions and atmospheric pressure for 20 minutes and then cool rapidly to 50° C. by vacuum dehydration. Adjust the pH of the system to 1–2 by the addition of dilute sulfuric acid and dehydrate the reaction mixture under 25" mercury vacuum starting at 70° C. As the mixture becomes dehydrated the temperature gradually rises to 90° C. If the mixture is to be neutralized, it should be neutralized at this point by the addition of sufficient alkali to attain a pH of about 7. Dehydration is continued at increasing temperature until 120° C. at 27" mercury vacuum is obtained. At this point the reaction is complete and the resin is obtained by removing it from the reaction vessel and cooling it to room temperature.

The product is a brittle, fusible resin soluble in alcohols and aqueous alkali having the following characteristics:

Melting point _____ 87±3° C.
Solution viscosity (50% solution in
 ethanol) _____ 90–120 centistokes.
pH _____ 7.7–8.0.

Example II

Mix 100 parts of cresol with 55 parts of formalin and adjust the pH of the mixture to about 8.5 with dilute aqueous sodium hydroxide. Heat the reaction mixture at 100° C. under reflux conditions and atmospheric pressure for 15–16 minutes and then cool rapidly to 50° C. by vacuum dehydration. Adjust the pH of the system to about 1 to 2 with dilute oxalic acid and then dehydrate the reaction mixture under about 25 to 27" mercury vacuum at elevated temperature. As the water is removed the temperature of the reaction rises gradually to about 120° C. at which temperature the reaction is substantially complete. Remove the product from the reaction vessel and cool. When cold, it is a brittle, fusible and alkali soluble resin which may be compounded with hexamethylene tetramine and molded by compression and transfer molding methods. The compounded resin has a softer flow and faster curing rate than one prepared from the same ingredients but entirely in an acid reaction.

The process outlined in the examples is critical in several respects, i. e. ratio of phenol to formaldehyde, pH of the initial reaction, duration of the initial reaction, and pH of the second reaction.

The ratio of phenol to aldehyde on a molar basis may vary from 1:0.75 to 1:0.85. Theoretically it would be possible to increase the amount of aldehyde to 0.99 mol but practically it has been observed that undesired results are obtained at such high aldehyde amounts due possibly to unforseen side-reactions. As phenols, there may be used phenol itself or cresols or xylenols or mixtures thereof. As aldehydes, the lower aliphatic aldehydes and furfural are operative. Formaldehyde is chiefly used for reasons of economy but special properties are obtained by substituting for all or part of the formaldehyde, such aldehydes as furfural, acetaldehyde, butyraldehyde, etc.

The initial reaction should be carried out at a pH of 8 to 11 until the aldehyde is substantially all reacted. The proper pH is attained by the addition of alkaline material such as alkali metal and alkaline earth metal hydroxides, ammonia, amines, quaternary ammonium compounds, etc. The particular alkaline material used will depend on the end use of the resin. If, for example, the molded articles are intended for electrical insulation calcium hydroxide should be used.

The temperature of the initial reaction may be varied between 90 and 110° C. Below 90° C. the reaction is too slow to be practical and above 110° C. it is almost impossible to control the rate of reaction. Temperature and rate control are easily maintained by conducting the reaction at reflux temperature and atmospheric pressure.

The duration of the initial reaction should be accurately controlled in relation to the temperature used. The duration range is from 15 minutes at 110° C. to 30 minutes at 90° C. If the reaction time is extended substantially beyond these limits the final molding powder will have a short flow and a fast rate of cure and no advantage will have been obtained by the alkaline reaction. If the reaction time is substantially below these limits, the acid reaction will proceed as in the conventional Novolaks and beneficial results are not obtained.

The next important step is substantial cooling, e. g., down to 40 to 50° C. followed by addition of sufficient acid to attain a pH of 3 or lower. The cooling is conveniently and quickly accomplished by reducing the pressure in the reaction vessel to 20 to 25" of mercury. It may also be accomplished by cooling the reaction vessel. The amount of acid to be added depends on the strength thereof and is regulated principally by measurement of the pH. The type of acid is material only when specific qualities are desired in the molded objects. For example, if calcium hydroxide is the alkaline catalyst in the initial reaction step, it is advantageous to use sulfuric acid in the second reaction since the salts produced give less operating difficulties than other calcium salts. Any acid may be used including inorganic and organic acids such as the halogen acids, hydrochloric acid, sulfuric, phosphoric, ethyl phosphoric, toluene sulfonic, oxalic, fluoroboric, etc. acids. The acids should be sufficiently diluted to prevent premature reaction.

The reaction under acid conditions may be conducted at 60 to 110° C. under atmospheric pressure, reduced pressure or superatmospheric pressure. It is complete in from 30 minutes to 2 hours dependent on the pH and temperature conditions. When the reaction is complete, a two phase resin-water system is obtained and the water must be removed to obtain a brittle resin adaptable to preparing a molding powder. It is convenient to carry out the acid reaction simultaneously with the removal of water by vacuum distillation. The vacuum distillation produces an excellent means for controlling the reaction temperature. In this method the reaction vessel is heated at elevated temperatures up to 150° C. but the temperature of the reaction mass is dependent on the amount of water therein and on the pressure. As the water is removed, the temperature rises gradually. The final temperature of the resin should not be above 120° C.

The acid reaction mixture may be neutralized at the end of the acid condensation reaction by the addition of sufficient alkali to attain a pH of 6.5 to 7.5 but the neutralization may be omitted depending mainly on the end use of the finished resin. If the acid reaction is carried out simultaneously with vacuum dehydration, the neutralization step may be carried out when the temperature of the reaction mass reaches about 90° C.

The resins thus made are brittle materials which may be easily crushed and then compounded with conventional molding powder ingredients such as fillers, pigments, lubricants and hardeners. They are surprisingly uniform both throughout a single batch and from batch to batch.

To form a thermosetting molding powder the resins must be compounded with an aldehyde or a compound which releases an aldehyde at molding temperatures. Volatile aldehydes like formaldehyde should be added in the solid form as paraformaldehyde or as a solid reaction product such as hexamethylene tetramine, hexamethylol melamine, etc. The amount of hardener will generally range from 5 to 15 parts per 100 parts of fusible resin.

*Example III*

Mix 100 parts of the brittle resin of Example I with 10 parts of hexamethylene tetramine on a heated roll mill. The product has a dry rubber at 150° C. of 90–110 secs. and an inclined plate flow of 4–70 mm. It is easily molded by compression and transfer molding methods and exhibits long flow and rapid curing during these operations.

The advantages of the resins of this invention are most readily recognized in their compounded or molding powder form. They exhibit a combination of long flow and fast cure not attainable by other phenolic resins. This renders the molding powders especially suitable for preparation of large moldings such as television cabinets by compression molding and articles prepared by transfer molding methods.

The impact strength of moldings made from the improved molding powders is relatively high when compared to molding powders made from the same ingredients by the conventional Novolak processes.

An outstanding property of the molding powders is their electrical arc resistance when filled with asbestos fillers. Phenolic resins are notorious for poor arc resistance whether filled with asbestos fibers or not. However, the resins of this invention have a surprisingly high resistance to an electric arc especially when filled with the asbestos fibers.

It is obvious that variations may be made in the processes and products of this invention without departing from the spirit and scope thereof as defined in the appended claims.

What is claimed is:

1. A process for preparing a fusible phenolic resin which comprises reacting 1 mol of a monohydric phenol taken from the group consisting of phenol, cresols and xylenols with from 0.75 to 0.85 mol of an aldehyde taken from the group consisting of furfural and aliphatic saturated unsubstituted aldehydes containing from 1 to 4 carbon atoms at a pH of 8 to 11 and a temperature of 90° to 110° C. for from 30 to 15 minutes, cooling the reaction medium to 40° C. to 50° C., adjusting the pH of the reaction medium to 1 to 3 and completing the condensation reaction by heating at 60 to 110° C., and dehydrating the reaction product.

2. A process as in claim 1 wherein the monohydric phenol is phenol and the aldehyde is formaldehyde.

3. A process as in claim 1 wherein the monohydric phenol is cresol and the aldehyde is formaldehyde.

4. A process as in claim 1 wherein the condensation reaction at a pH of 1 to 3 is carried out simultaneously with vacuum dehydration of the reaction mass.

5. A process as in claim 1 wherein the final condensation product is neutralized before complete dehydration thereof.

6. A fusible phenolic resin prepared by the process of claim 1.

7. A molding powder comprising 100 parts of a Novolak and 5 to 15 parts of a compound taken from the group consisting of aldehydes and compounds releasing aldehydes, said Novolak having been prepared by reacting 1 mol of a monohydric phenol taken from the group consisting of phenol, cresols and xylenols with from 0.75 to 0.85 mol of an aldehyde taken from the group consisting of furfural and saturated unsubstituted aliphatic aldehydes containing from 1 to 4 carbon atoms at a pH of 8 to 11 at a temperature of 90 to 110° C. and for 30 to 15 minutes, cooling the reaction medium to 40° C. to 50° C., adjusting the pH of the reaction medium to 1 to 3 and completing the condensation reaction at 60 to 110° C. and dehydrating the product.

8. A molding powder as in claim 7 wherein the compound is hexamethylene tetramine.

References Cited in the file of this patent

UNITED STATES PATENTS 2,617,785     Pritchett _____ Nov. 11, 1952

FOREIGN PATENTS 615,488     Great Britain _____ Jan. 6, 1949